US008675362B2

(12) United States Patent  
Ogawa

(10) Patent No.: US 8,675,362 B2
(45) Date of Patent: Mar. 18, 2014

(54) ELECTRONIC DEVICE

(75) Inventor: Susumu Ogawa, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 13/576,384

(22) PCT Filed: Mar. 9, 2010

(86) PCT No.: PCT/JP2010/053875
§ 371 (c)(1),
(2), (4) Date: Jul. 31, 2012

(87) PCT Pub. No.: WO2011/111165
PCT Pub. Date: Sep. 15, 2011

(65) Prior Publication Data
US 2012/0307435 A1    Dec. 6, 2012

(51) Int. Cl.
G06F 1/16      (2006.01)
H05K 5/00     (2006.01)
H05K 7/00     (2006.01)
H04N 5/64     (2006.01)

(52) U.S. Cl.
USPC ............. 361/679.59; 348/744; 348/789

(58) Field of Classification Search
USPC ............. 361/679.59; 348/744, 789
See application file for complete search history.

(56) References Cited

U.S. PATENT DOCUMENTS 5,913,605 A * 6/1999 Jusselin et al. ............. 37/451
7,535,721 B2  5/2009 Okoshi et al.
7,855,883 B2 * 12/2010 Tang ................ 361/679.55
8,491,129 B2 * 7/2013 Koyama ................... 353/70
2005/0185386 A1  8/2005 Okoshi et al.
2010/0149752 A1 * 6/2010 Lian .................. 361/679.59

FOREIGN PATENT DOCUMENTS

| CN | 1658062 A | 8/2005 |
| CN | 101271260 (A) | 9/2008 |
| JP | 2001-42423 (A) | 2/2001 |
| JP | 2005-234304 A | 9/2005 |
| JP | 2008-242159 A | 10/2008 |

OTHER PUBLICATIONS

International Search Report in PCT/JP2010/053875 dated May 18, 2010 (English Translation Thereof).
Chinese Office Action dated Dec. 4, 2013, with English translation.

* cited by examiner

*Primary Examiner* — Adrian S Wilson
(74) *Attorney, Agent, or Firm* — McGinn IP Law Group, PLLC

(57) ABSTRACT

An electronic device of the present application includes a case, leg that has a hollow stem portion, and leg fixing part. Leg fixing part is a part that is formed in one face of case and that has a hole into which leg is inserted and that includes case thread ridge portion formed on an inside face of the hole. Leg has first screw structure portion and second screw structure portion formed on a circumferential face of the stem portion thereof, first screw structure portion is formed of a plurality of turns of continuous thread ridge that can be screwed into case thread ridge portion, second screw structure portion is formed of one or more turns of thread ridge at the same screw pitch as first screw structure portion and screwed into case thread ridge portion before first screw structure portion is screwed when leg is inserted into the hole.

6 Claims, 6 Drawing Sheets

(a)

(b)

ELECTRONIC DEVICE

TECHNICAL FIELD

The present invention relates to a mechanism of a leg part for adjusting the inclination and the height of an electronic device with respect to a setting plane.

BACKGROUND ART

An electronic device is provided with a mechanism for easily adjusting its height and inclination. For example, as disclosed in a patent document 1 (Japanese Unexamined Patent Publication No. 2005-234307), there is proposed a structure in which a leg is extended or retracted by a screw structure.

However, in this type of structure, there is presented the following problem: when the leg is extended, if the leg is extended to a position in which the leg is brought into a state where the leg is not engaged in the screw structure, the leg will drop out from a main body of the electronic device. Thus, there is proposed a countermeasure of providing a root portion of the leg with a retaining structure which is larger than the outer diameter of the leg so as to prevent the leg from easily being dropped. However, this countermeasure presents a problem of increasing the assembly process when the leg is mounted in the main body of the electronic device.

PRIOR ART LITERATURE

Patent Document

Patent document 1: Japanese Unexamined Patent Publication No. 2005-234307

SUMMARY OF THE INVENTION

An object of the present is to provide an electronic device having a leg part capable of solving the problem in the background art described above. One example of the object is to provide an expandable and retractable leg, which can be easily mounted in a main body of an electronic device and which has a structure for preventing a leg from being dropped, and an electronic device that has the leg like this.

An electronic device according to one embodiment of the present invention includes a case, a leg having a hollow stem portion, and a leg fixing part. The leg fixing part is a part that is formed in one face of the case and that has a hole into which the leg is inserted and that includes a case thread ridge portion formed on an inside face of the hole.

The leg has a first screw structure portion and a second screw structure portion formed on a circumferential face of the stem portion thereof, the first screw structure portion made up of a plurality of turns of continuous thread ridge that can be screwed with the case thread ridge portion, the second screw structure portion made up of one or more turns of thread ridge at the same screw pitch as the first screw structure portion and being screwed with the case thread ridge portion before the first screw structure portion when the leg is inserted into the hole.

The second screw structure portion includes a coupling portion, a guide portion, and an idle turn inducing portion, the guide portion and the idle turn inducing portion being formed in the coupling portion.

The coupling portion is a portion that is arranged so as to couple a start point and an end point of one or more turns and more of thread ridge and that can be displaced toward a central axis of the leg.

The guide portion guides a thread ridge of the case thread ridge portion between the thread ridges of the second screw structure portion in such a way that when the leg is inserted into the hole while it is turned in a direction in which the leg is inserted into the case, the second screw structure portion is screwed with the case thread ridge portion.

Further, the idle turn inducing portion idly turns the second screw structure portion with respect to the case thread ridge portion in such a way that when the leg is turned in a direction in which the leg is pulled out of the case, the second screw structure portion is not screwed with the case thread ridge portion.

BRIEF DESCRIPTION OF THE DRAWINGS

FIG. 1A is a perspective view, when viewed obliquely from the top, of a projection type display device having legs according to one embodiment of the present invention,
and FIG. 1B is a perspective view, when viewed obliquely from the bottom, of the display device.

FIG. 2 is a perspective view to illustrate a state in which the leg according to the one embodiment of the present invention is fixed to the display device with a main body of the display device (hereinafter referred to as "a device main body") exploded.

FIG. 3 is a view to illustrate a state in which the leg according to the one embodiment of the present invention is being fixed to the device main body.

FIG. 4A is a side view of the leg according to the one embodiment of the present invention,
and FIG. 4B is a partial enlarged view of the leg shown in FIG. 4A,
and FIG. 4C is a section view along a line A-A in FIG. 4A.

FIG. 5A is a plan view to show an inside face of a case in which a leg fixing part, to which the leg shown in FIG. 3
and FIG. 4 is fixed, is located,
and FIG. 5B is a perspective view, when viewed from a side, of a portion in which the leg fixing part of the case main body is located.

FIG. 6A is a plan view to show the inside face of the case in which the leg fixing part, to which the leg shown in FIG. 3
and FIG. 4 is fixed, is located,
and FIG. 6B is a section view along a line C-C in FIG. 4A.

MODE FOR CARRYING OUT THE INVENTION

Hereinafter, an embodiment of the present invention will be described with reference to the drawings. Here, by taking a projection type display device as an example, the embodiment of the present invention will be described in detail. However, the present invention can be applied to any electronic device that needs to have its height adjusted with respect to a setting plane, and the device to which the present invention is applied is not limited to the projection type display device.

Figure 1:
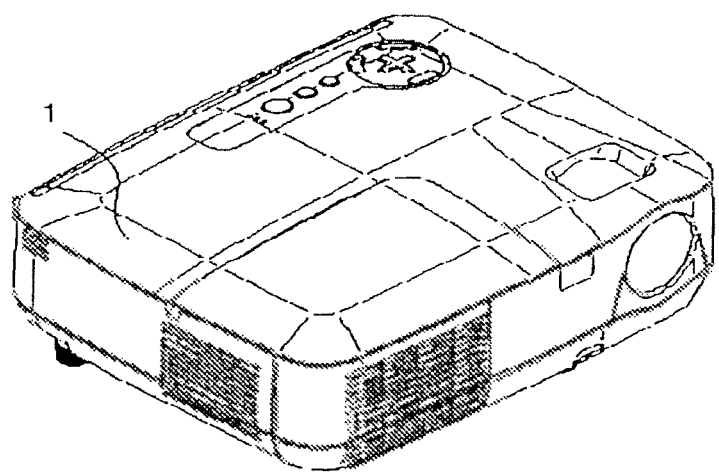
[FIG. 1]
Figure 1:
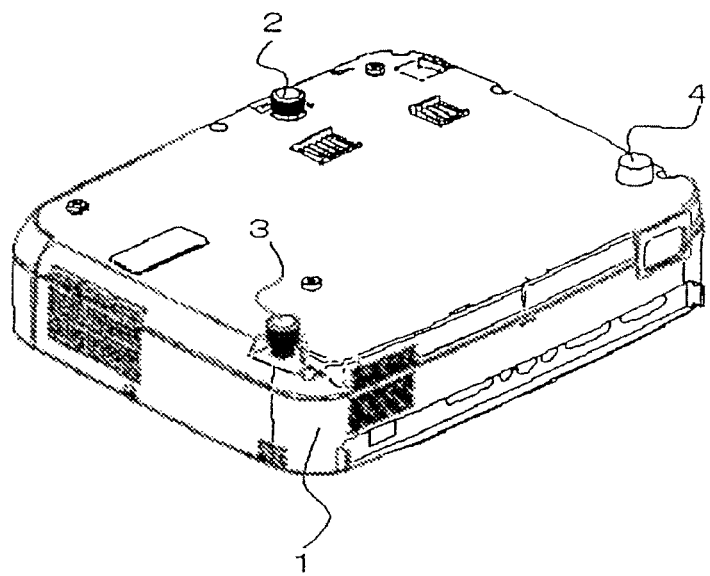

FIG. 1 shows a projection type display device having a leg according to one embodiment of the present invention. FIG. 1A is a perspective view, when viewed from atop face side of the device, and FIG. 1B is a perspective view, when viewed from a bottom face side of the device. The device has one leg in the front portion of the bottom face of device main body (case) 1 and two legs in the rear portion of the bottom face, that is, three legs 2, 3, and 4 in total. Leg 2 in the front portion and leg 3, which is one of the legs in the rear portion, can have their heights adjusted. A user can adjust the height and the inclination of the projection type display device with respect to the setting plane by using these legs 2, 3.

Next, leg 3 according to the present invention, and a case structure to which leg 3 is fixed, will be described in detail.

Figure 2:
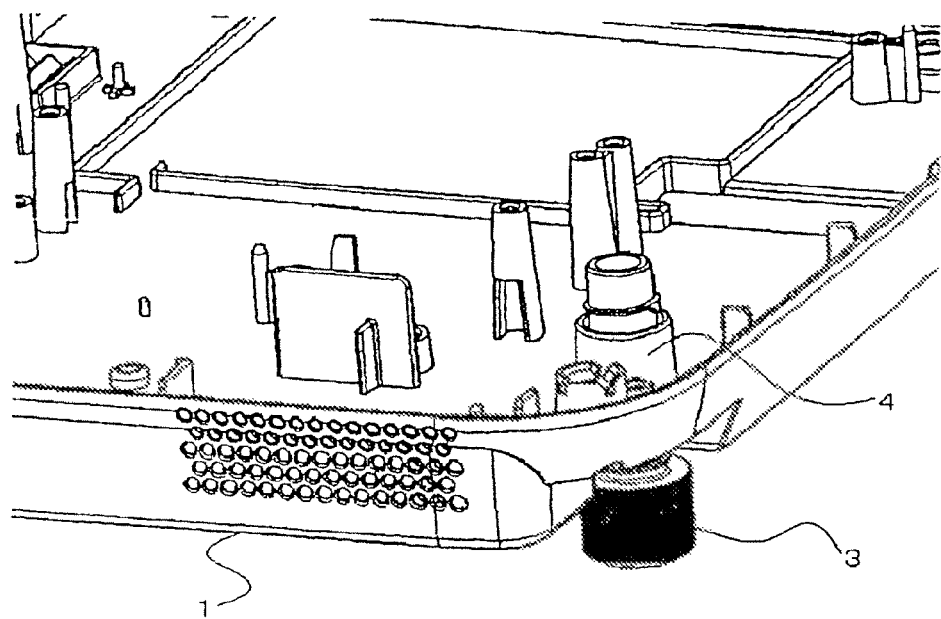
[FIG. 2]
Figure 3:
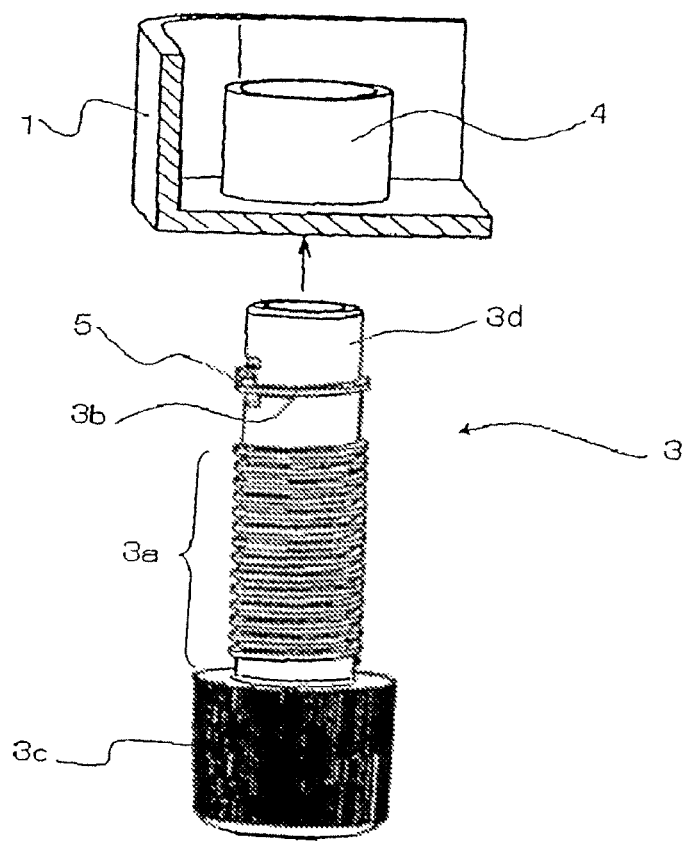
[FIG. 3]

FIG. 2 is an exploded view in perspective to illustrate the state in which the leg 3 is fixed to device main body 1 with device main body 1 exploded. FIG. 3 is an assembly view of the leg 3. Here, FIG. 3 does not show the whole of device main body 1 but shows only leg fixing part 4 to which leg 3 is fixed.

In the leg 3, stem portion 3d of leg 3 is provided with first screw structure portion 3a and second screw structure portion 3b. Stem portion 3d of leg 3 is a hollow stem portion like a cylinder. First screw structure portion 3a is located closer to a setting plane side of device main body 1 than second screw structure portion 3b in a state where leg 3 is mounted in device main body 1. An end portion of leg 3 that is on the setting plane side of device main body 1 is operating portion 3c that is held by a person who inserts the leg 3 in the device main body 1.

The first screw structure portion 3a is formed of a plurality of turns of ordinary thread ridge made on the circumferential surface of stem portion 3d of the leg 3. As is the usual case, first screw structure portion 3a functions as an operating portion for extending or retracting (moving up or down) leg 3 with respect to device main body 1. Second screw structure portion 3b is provided at a position separate from first screw structure portion 3a. This second screw structure portion 3b functions as a portion for preventing leg 3 from dropping out.

Second screw structure portion 3b is made up of one ore more turns of a thread ridge, and the start point and the end point of the thread ridge are coupled to each other by coupling portion 5. The height from the circumferential surface of stem portion 3d to the surface of coupling portion 5 is nearly equal to the height of the thread ridge. Further, the screw pitch of first screw structure portion 3a is equal to the screw pitch of second screw structure portion 3b, and both first screw structure portion 3a and second screw structure portion 3b are the same, also in a direction in which the thread ridge is turned.

Figure 4:
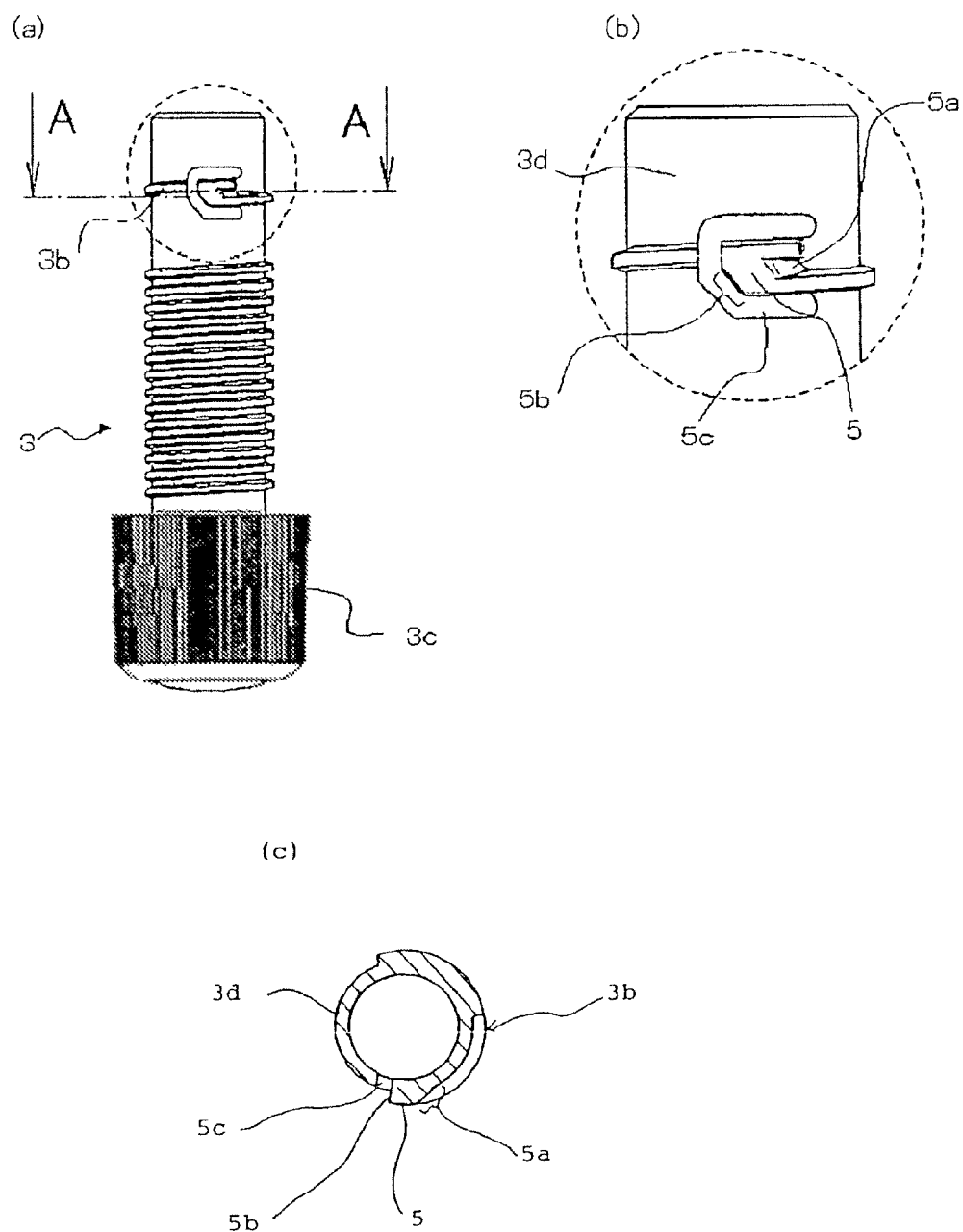
[FIG. 4]

In FIG. 4 is shown a specific construction of leg 3. FIG. 4A is a side view of leg 3, and FIG. 4B is an enlarged view of a portion encircled by a single dot and dash line in FIG. 4A, and FIG. 4C is a section view along line A-A in FIG. 4A. As shown in these drawings, coupling portion 5 of second screw structure portion 3b has guide portion 5a, reverse turn & breakage preventing portion 5b, and aperture portion 5c formed therein, aperture portion 5c making it possible for guide portion 5a and reverse turn & breakage preventing portion 5b to be displaced.

Guide portion 5a is located on the front side in a direction in which leg 3 is turned when leg 3 is mounted in device main body 1. Guide portion 5a is constructed of a face inclined to the outside face of coupling portion 5 from the circumferential face of stem portion 3d of leg 3.

Reverse turn & breakage preventing portion 5b is located on the side opposite to guide portion 5a. Reverse turn & breakage preventing portion 5b is constructed of a face inclined counterclockwise, as shown in FIG. 4B, with respect to the plane including the axial center of stem portion 3d of leg 3, and the face is nearly vertical to the circumferential surface of stem portion 3d of leg 3.

Aperture portion 5c passes through stem portion 3d from the outside of stem portion 3d to an internal space of stem portion 3d and crosses a part of second screw structure portion 3b on a circumferential surface of stem portion 3d and extends in the shape of a letter U in such a way as to surround both end portions (the start point and the end point) of the thread ridge which are coupled by coupling portion 5 (see FIG. 4B). Since aperture portion 5c like this is formed, coupling portion 5 can be provided with flexibility and hence can be displaced toward the central axis of leg 3. In this regard, in place of the exemplary shape of aperture portion 5c shown in FIG. 4B, it is also recommended to form a through slit hole in a peripheral portion of coupling portion 5 from which guide portion 5a side is removed (that is, a portion along the edges of coupling portion 5 and the thread ridge and reverse turn & breakage preventing portion 5b) to thereby make it possible for only coupling portion 5 to be alone displaced.

Figure 5:
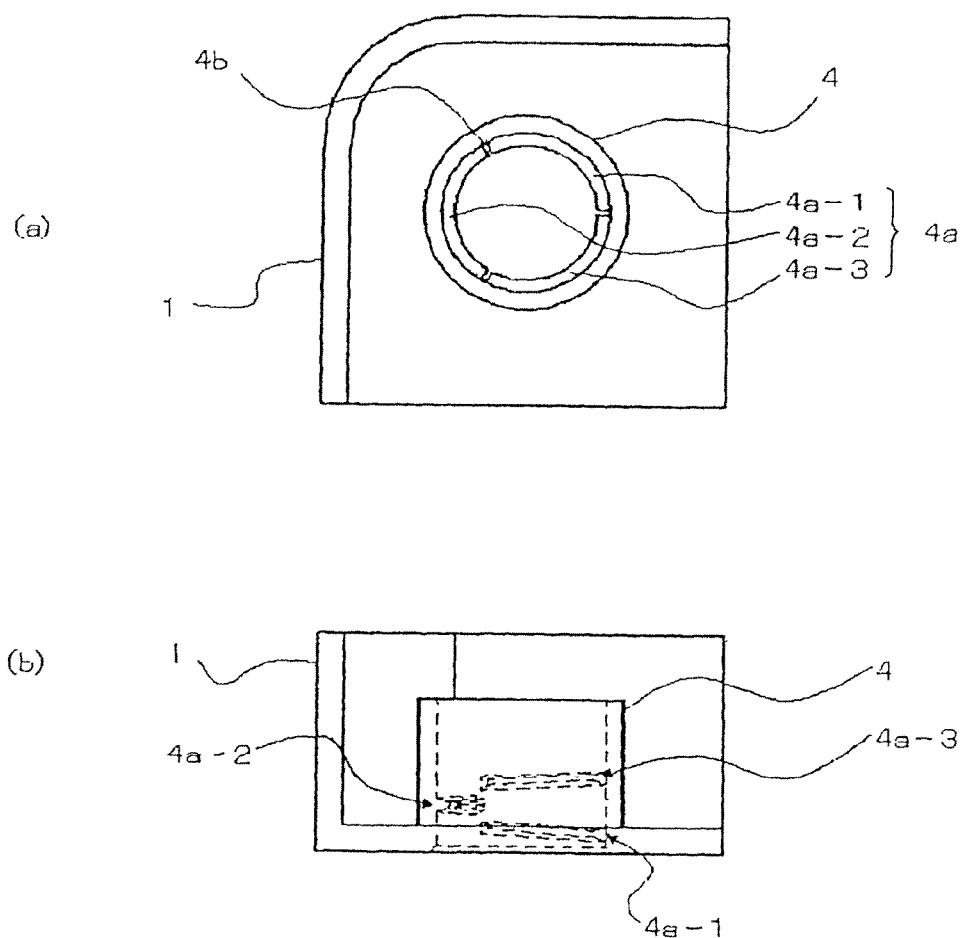
[FIG. 5]
Figure 6:
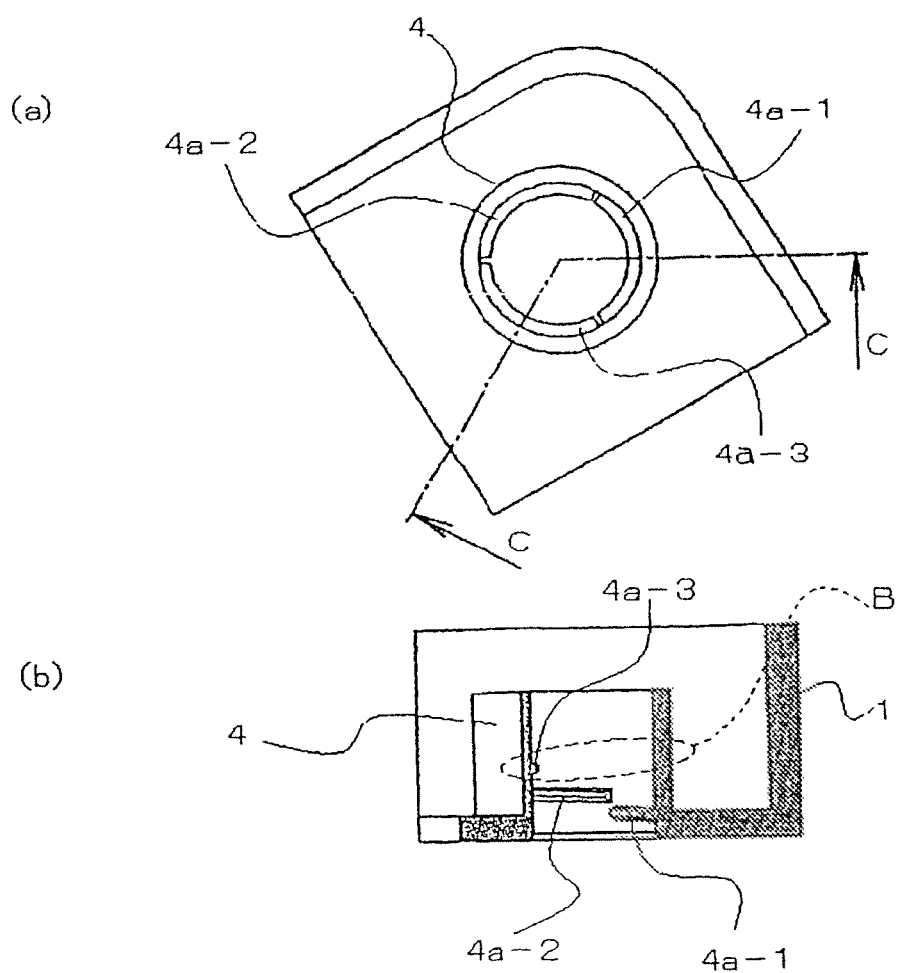
[FIG. 6]

FIG. 5 shows a structure of leg fixing part 4 to which leg 3 is fixed. FIG. 5A is a top view to show the inside face of device main body 1 in which leg fixing part 4 is arranged, and FIG. 5B is a longitudinal section view of a portion in which leg fixing part 4 of device main body 1 is located.

Leg fixing part 4 shaped like a cylinder is provided on the inside face of the device main body (case) 1. On the inside face of its hole shaped like a cylinder is provided case thread ridge portion 4a having the same screw pitch as screw structure portions 3a, 3b of leg 3. Screw structure portions 3a, 3b and case thread ridge portion 4a are constructed in such a way that when leg 3 is turned clockwise, screw structure portions 3a, 3b and case thread ridge portion 4a are screwed with each other to thereby make leg 3 travel into device main body (case) 1 and that when leg 3 is turned counterclockwise, leg 3 is caused to travel out to the outside of device main body (case) 1.

Case thread ridge portion 4a is at least three pitches (three stages) of thread ridges and is constructed of three thread ridge portions. In other words, case thread ridge portion 4a has first thread ridge portion 4a-1, second thread ridge portion 4a-2, and third thread ridge portion 4a-3 for each one turn of three turns (three screw pitches) of the thread ridge. Further, case thread ridge portion 4a is constructed in such a way that when the interior of the hole of leg fixing part 4 is viewed from the bottom face of device main body 1, first thread ridge portion 4a-1, second thread ridge portion 4a-2, and third thread ridge portion 4a-3 do not overlap each other (see FIG. 5A). For this reason, each of first thread ridge portion 4a-1, second thread ridge portion 4a-2, and third thread ridge portion 4a-3 is constructed of a thread ridge portion corresponding to a portion smaller than one portion when a single turn of thread ridge is divided into three equal portions. More preferably, case thread ridge portion 4a is constructed in such a way that when leg fixing part 4 is viewed from the bottom face of device main body 1, gap 4b is formed respectively between respective thread ridge portions 4a-1, 4a-2, and 4a-3.

In this way, the present invention employs a construction such that the plurality of thread ridge portions are isolated from each other, so that a forming mold structure can be made simpler than in the case where a thread ridge is continuously formed. The employment of this construction can eliminate, for example, the need for using a sliding mechanism for the forming mold. Thus, when a device main body of an electronic device is manufactured by the use of a mold, the device main body can be manufactured at a low cost.

Next, an operation of mounting leg 3 in device main body 1 will be described.

When a user inserts leg 3 straight into the hole of leg fixing part 4, second screw structure portion 3b butts against case thread ridge portion 4a provided in leg fixing part 4 and hence the user cannot insert leg 3 into the hole of leg fixing part 4.

Thus, when the user holds operating portion 3c of leg 3 with his/her hand and inserts leg 3 inside leg fixing part 4 while turning leg 3, second screw structure portion 3b is screwed with case thread ridge portion 4a, whereby leg 3 can be inserted. Specifically, first, when the user turns leg 3 clockwise, guide portion 5a of coupling portion 5 of second screw structure portion 3b formed on leg 3 (see FIGS. 4B and 4C) butts against first thread ridge portion 4a-1 of case thread ridge portion 4a.

Then, when the user further turns leg 3, first thread ridge portion 4a-1 climbs over guide portion 5a because, as shown in FIG. 4B, guide portion 5a is inclined to the outside face of coupling portion 5 from the circumferential face of stem portion 3d of leg 3.

When first thread ridge portion 4a-1 climbs up guide portion 5a, coupling portion 5 is displaced toward the central axis of leg 3 because aperture portion 5c is formed, so that first thread ridge portion 4a-1 can easily climb over guide portion 5a and hence leg 3 can be inserted.

When second screw structure portion 3b passes first thread ridge portion 4a-1, guide portion 5a of coupling portion 5 of second screw structure portion 3b butts against second thread ridge portion 4a-2. Also in this case, as is the same as the above case, coupling portion 5 of second screw structure portion 3b passes second thread ridge portion 4a-2. Then, when the user further turns leg 3, coupling portion 5 of second screw structure portion 3b passes third thread ridge portion 4a-3.

In this way, the second screw structure portion 3b completely passes the case thread ridge portion 4a inside the leg fixing portion 4. Then, when the user further pushes in leg 3, while turning leg 3, first screw structure portion 3a screws into case thread ridge portion 4a and passes case thread ridge portion 4a, whereby leg 3 is received in the device main body (case) 1.

On the other hand, when the user turns leg 3 received in device main body (case) 1 counterclockwise, the user can pull out leg 3 from the device main body (case) 1. The adjustment of extension and retraction (the adjustment of the length) of leg 3 can be realized by the construction described above.

When the user completely pulls first screw structure portion 3a out of device main body (case) 1 in the process of extending the leg 3, case thread ridge portion 4a of leg fixing portion 4 will be located between the first screw structure portion 3a and the second screw structure portion 3b.

In this state, second screw structure portion 3b is received by case thread ridge portion 4a, so that leg 3 can be prevented from dropping out. Further, even if the user intends to pull out leg 3 to turn leg 3 counterclockwise, the state in which leg 3 is pulled out is hardly changed. As leg 3 is turned counterclockwise, reverse turn & breakage preventing portion 5b of coupling portion 5 of leg 3 butts against the case thread ridge portion 4a, so that second screw structure portion 3b cannot be made to travel further in the direction in which leg 3 has been pulled out.

This is because reverse turn & breakage preventing portion 5b is constructed of a face nearly vertical to the circumferential surface of stem portion 3d of leg 3 and the face is inclined counterclockwise, as shown in FIG. 4B, with respect to a plane including the axial center of stem portion 3d. For this reason, when the user turns leg 3 counterclockwise, reverse turn & breakage preventing portion 5b continuously prevents case thread ridge portion 4a from screwing into second screw structure portion 3b. As a result, case thread ridge portion 4a does not climb over coupling portion 5 of second screw structure portion 3b and hence the displacement of coupling portion 5 to the central axis of leg 3 does not occurred, so that leg 3 is held turned idly at the same position. Reverse turn & breakage preventing portion 5b is also an idle turn inducing portion of leg 3.

Since leg 3 can be turned at the same place, even if leg 3 is operated by more rotational force than is necessary, leg 3 and leg fixing portion 4 will not have any force applied to them and thus leg 3 and leg fixing portion 4 will not be broken. Here, when the user completely pulls leg 3 out of device main body 1, the user can pull out leg 3 by turning leg 3 while inclining leg 3.

According to the above-mentioned construction of the present invention, leg 3 can be mounted easily like a screw in main body 1 of the electronic device. When the user turns leg 3 mounted in main body 1 of the electronic device to thereby extend leg 3, second screw structure portion 3b engages with case thread ridge portion 4a and hence leg 3 turns idly at the portion, so that the user cannot further pull out leg 3. Thus, the construction of the present invention can prevent leg 3 from being dropping out.

Up to this point, the present invention has been described with reference to the exemplary embodiment, but the present invention is not limited to the exemplary embodiment described above. Various modifications to be understood by a person skilled in the art can be made to the construction and the details of the present invention within the scope of the technical thought of the present invention.

DESCRIPTION OF REFERENCE NUMERALS AND SIGNS 1 device main body
2, 3 leg
3a first screw structure portion
3b second screw structure portion
3c operating portion
3d stem portion
4 leg fixing part
4a case thread ridge portion
4a-1 first thread ridge portion
4a-2 second thread ridge portion
4a-3 third thread ridge portion
5 coupling portion
5a guide portion
5b idle turn inducing portion
5c aperture portion

The invention claimed is:
1. An electronic device comprising:
a case;
a leg that has a hollow stem portion; and
a leg fixing part that is formed in one face of the case and that has a hole into which the leg is inserted and that includes a case thread ridge portion formed on an inside face of the hole; wherein the leg has a first screw structure portion and a second screw structure portion formed on a circumferential face of the stem portion thereof, the first screw structure portion being formed of a plurality of turns of continuous thread ridge that can be screwed into the case thread ridge portion, the second screw structure portion being formed of one or more turns of a thread ridge at a same screw pitch as the first screw structure portion and being screwed into the case thread ridge portion before the first screw structure portion is screwed when the leg is inserted into the hole, and
wherein the second screw structure portion has:
a coupling portion that is arranged so as to couple a start point and an end point of said one or more turns of a thread ridge and that can be displaced toward a central axis of the leg;
a guide portion that is formed in the coupling portion and that guides a thread ridge of the case thread ridge portion between the thread ridges of the second screw structure portion in such a way that when the leg is inserted into the hole while it is turned in a direction in which the leg is inserted into the case, the second screw structure portion is screwed into the case thread ridge portion; and an idle turn inducing portion that is formed in the coupling portion and that idly turns the second screw structure portion with respect to the case thread ridge portion in such a way that when the leg is turned in a direction in which the leg is pulled out of the case, the second screw structure portion is not screwed into the case thread ridge portion.

2. The electronic device as claimed in claim 1, wherein the guide portion is formed on one face, which is a face on a front side in a direction in which the leg is inserted and turned, of both end surfaces of the coupling portion related to a circumferential direction of the stem portion and is inclined to an outside face of the coupling portion from a circumferential face of the stem portion, wherein the idle turn inducing portion includes a face, which is formed on a side opposite to the one face of the coupling portion and along a radial direction of the stem portion of the leg, the face being inclined counterclockwise with respect to a plane including an axial center of the stem portion of the leg, and wherein the leg has an aperture portion that is formed through the stem portion from a circumferential surface of the stem portion to a hollow portion of the stem portion in a circumferential portion of the coupling portion to thereby make it possible to displace the coupling portion to an axial center of the leg.

3. The electronic device as claimed in claim 2, wherein the case thread ridge portion includes at least a first thread ridge portion, a second thread ridge portion, and a third thread ridge portion, and wherein each of the first thread ridge portion, the second thread ridge portion, and the third thread ridge portion is provided for each single turn of three turns of a thread ridge and corresponds to a portion, which is smaller than one portion when a single turn of thread ridge is divided into three equal portions, and is arranged in such a way that they do not overlap each other when viewed from a direction in which the leg is inserted into the aperture portion.

4. The electronic device as claimed in claim 1, wherein the second screw structure portion is arranged separately from the first screw structure portion in such a way that after the leg is inserted into the aperture portion and the second screw structure portion passes the case thread ridge portion, the case thread ridge portion is located between the first screw structure portion and the second screw structure portion.

5. The electronic device as claimed in claim 2, wherein the second screw structure portion is arranged separately from the first screw structure portion in such a way that after the leg is inserted into the aperture portion and the second screw structure portion passes the case thread ridge portion, the case thread ridge portion is located between the first screw structure portion and the second screw structure portion.

6. The electronic device as claimed in claim 3, wherein the second screw structure portion is arranged separately from the first screw structure portion in such a way that after the leg is inserted into the aperture portion and the second screw structure portion passes the case thread ridge portion, the case thread ridge portion is located between the first screw structure portion and the second screw structure portion.

\* \* \* \* \*